United States Patent [19]

Kawachi et al.

[11] Patent Number: 4,997,708
[45] Date of Patent: Mar. 5, 1991

[54] FLUORORESIN/METAL BASE FUNCTIONALLY GRADIENT MATERIAL

[75] Inventors: Shogi Kawachi, Nishinomiya; Hirofumi Nishibayashi, Settsu; Tohru Hirano; Junichi Teraki, both of Sakai; Masayuki Niino, Sendai, all of Japan

[73] Assignees: Science and Technology Agency, Tokyo; Daikin Industries Ltd., Osaka, both of Japan

[21] Appl. No.: 318,633

[22] Filed: Mar. 3, 1989

[30] Foreign Application Priority Data

Sep. 24, 1988 [JP] Japan ............................. 63-240487

[51] Int. Cl.$^5$ .................. B32B 5/16; B32B 27/00

[52] U.S. Cl. ........................... 428/323; 428/328; 428/421; 428/422

[58] Field of Search ............... 428/422, 421; 204/283; 429/42

[56] References Cited

U.S. PATENT DOCUMENTS 4,421,574 12/1983 Covitch et al. ............... 204/283 X
4,469,579 9/1984 Covitch et al. ............... 429/42 X Primary Examiner—Thomas J. Herbert
Attorney, Agent, or Firm—Birch, Stewart, Kolasch & Birch

[57] ABSTRACT

A novel metal/polymer base functionally gradient material comprising silver and a fluororesin in which the composition of silver and the fluororesin is continuously changed from one side to the other.

11 Claims, 6 Drawing Sheets

4,997,708

FLUORORESIN/METAL BASE FUNCTIONALLY GRADIENT MATERIAL

BACKGROUND OF THE INVENTION

1. Field of the Invention

The present invention relates to a fluororesin/ metal base functionally gradient material. More particularly, the present invention relates to a functionally gradient material comprising polytetrafluoroethylene and silver.

2. Description of the Related Art

As one of materials which can be used under severe conditions under which no single-component material can be employed, functionally gradient materials have been developed. The hitherto developed functionally gradient materials are based on the combinations of a metal and ceramics or ceramics and ceramics, but any functionally gradient material based on a polymer/-metal combination has not been developed (cf. Masayuki Niino, "Generation of Functionally gradient Materials by the Application of Compositing Techniques", KOGYO-ZAIRYO, Vol. 35, No. 14, October 1987, 101–109).

As a material made of the polymer/metal combination, a polymer/metal composite material is known. However, not only the composite material has a homogeneous composition, but also the metal content has its own upper limit. This is because the object of compositing is to improve the properties of the polymer, that is, the compositing is intended to improve the specific properties of the polymer such as mechanical properties, thermal properties and electrical properties while maintaining the inherent properties of the polymer.

A temperature at which the polymer/metal composite material is molded is uniquely determined based on the type of polymer. At such a temperature, metal fillers are not bonded together or densified, and an increase in the amount of metal fillers would lead to a decrease in the mechanical strength or elongation of the composite material.

As the polymer/metal composite material in which the metal forms a matrix, a porous metal impregnated with a polymer is known. However, it is hardly possible to composite the metal and the polymer at an arbitrary ratio, because there will be many limitations placed on the composition range and microstructure thereof.

Accordingly, there has been neither polymer/metal functionally gradient material nor technique for widely varying the composition of the metal and the polymer within the composite material.

The polymer and the metal are in contact with each other in thermal, mechanical and electrical properties. For example, polytetrafluoroethylene and silver are compared. The coefficient of thermal conductivity is 0.2512 W/m.K for the former and 417.6 W/m.K for the latter. The Young's modulus is $5.13 \times 10^8$ Pa for the former and $8.00 \times 10^{10}$ Pa for the latter. The volume resistivity is $10^{18}$ ohm.cm for the former and $1.62 \times 10^{-6}$ ohm.cm for the latter.

Therefore, it will be beneficial for the material design to drastically change the properties of the material by controlling the metal/polymer composition within a wide range.

SUMMARY OF THE INVENTION

One object of the present invention is to provide a novel functionally gradient material comprising a metal and a polymer, particularly a fluororesin.

Another object of the present invention is to provide a method for producing a functionally gradient material comprising a metal and a fluororesin, by which an arbitrary composition is selected from a wide composition range and wherein the composition is graded in the material in an arbitrary composition distribution so that the properties of the material such as thermal insulation are freely designed.

Accordingly, the present invention provides a metal/polymer base functionally gradient material comprising silver and a fluororesin in which the composition of silver and the fluororesin is continuously changed from one side to the other.

DETAILED DESCRIPTION OF THE DRAWINGS

Figure 3B:
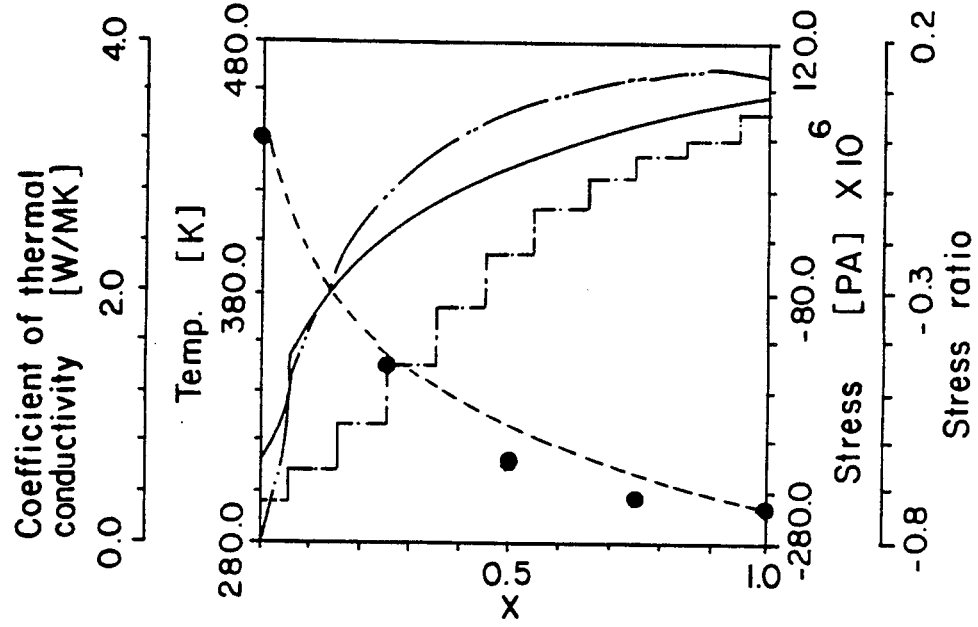
FIGS. 3B and 4B are graphs showing the simulated results of the characteristics of the functionally gradient material in which the composition is continuously changed.
Figure 3A:
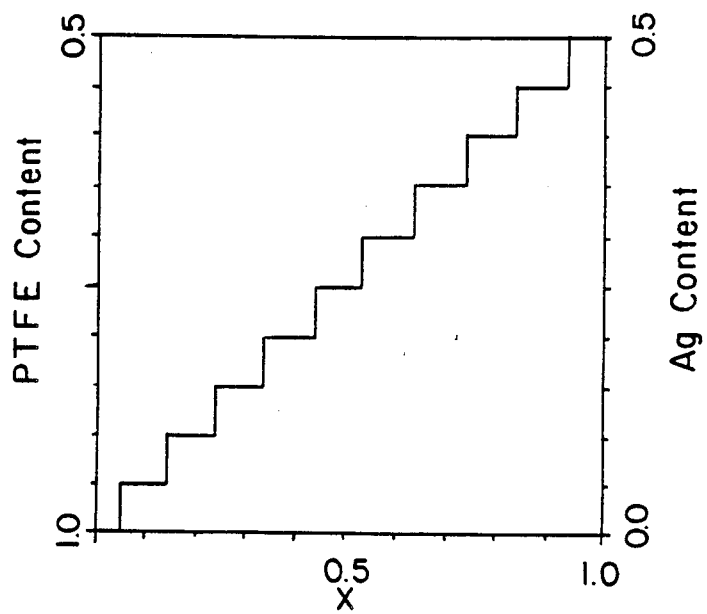
FIGS. 3A and 4A are graphs showing the measured and simulated results of the characteristics of the functionally gradient material produced in Example 2.
Figure 3D:
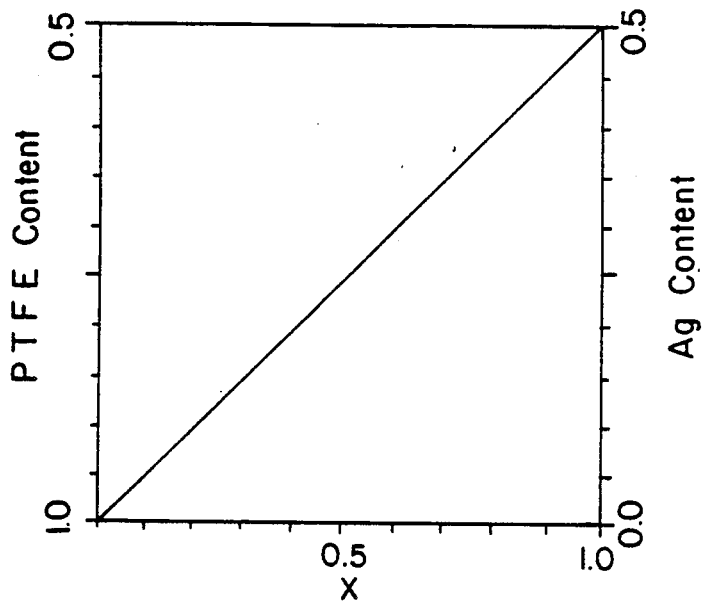
Figure 3C:
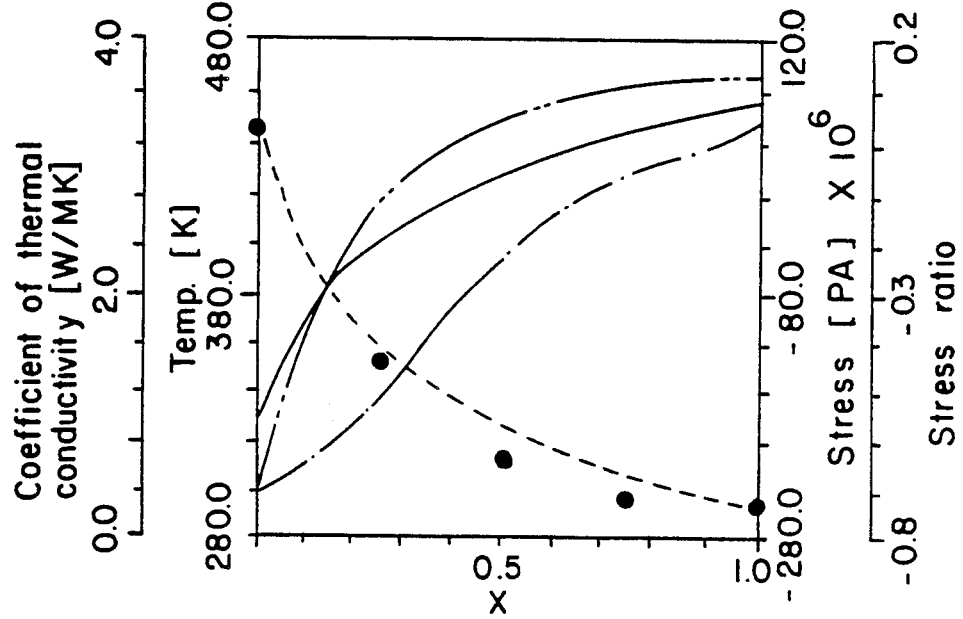

In the context of the present specification, a functionally gradient material is intended to define a material comprising at least two components and the composition of the components is continuously changed. The continuous change of the composition includes not only a case where the composition is linearly changed as shown in FIG. 3B, but also where the composition is stepwise changed as shown in FIG. 3A.

Since the functionally gradient material can be prepared according to a powder metallurgical method which will be described in detail below, the components should have a common sintering temperature to compact the material. According to the present invention, as the polymer component, a fluororesin having a relatively high melting point is used, and as the metal component, silver having a relatively low melting point is used.

Specific examples of the fluororesin are polytetrafluoroethylene (hereinafter referred to as "PTFE"); copolymers of tetrafluoroethylene with at least one other ethylenically unsaturated monomer which is copolymerizable with tetrafluoroethylene such as an olefin (e.g. ethylene, propylene, etc.), a halogenated olefin (e.g. hexafluoropropylene, vinylidene fluoride, chlorotrifluoroethylene, vinyl fluoride, etc.), a perfluoro(alkyl vinyl ethers) and the like; polychlorotrifluoroethylene; polyvinylidene fluoride; and the like. Among these PTFE and copolymers of tetrafluoroethylene with at least one comonomer selected from the group consisting of hexafluoropropylene, perfluoro(methyl vinyl ether), perfluoro(ethyl vinyl ether) and perfluoro(propyl vinyl ether) are preferred. In the copolymers, the comonomers are contained in an amount of not larger than 40 % by mole based on the amount of the tetrafluoroethylene. Particularly, PTFE is preferred since it has a sintering temperature approximates that of silver (both about 370° C.).

Silver can be used in any form such as powder, granules, particles, flakes, etc. Preferably, silver has an average particle size of about 0.1 to 100 $\mu$m, more preferably, 25 to 30 $\mu$m.

As an optional component to be contained in the functionally gradient material of the present invention, microballoons are exemplified. The microballoons may be made of polymers, glass, ceramics, etc. By the introduction of holes in the functionally gradient material of the present invention by means of the addition of the microballoons, improvements in thermal insulation and stress relaxation can be expected.

Now, the production of the PTFE/Ag base stepwise functionally gradient material of the present invention will be explained.

A. Powder mixing

By changing the ratio of PTFE powder and silver powder, a homogeneous powder mixture having an arbitrary composition is prepared. As a mixer, a ball mill, a rod mill, a double-cone mixer, a twin-cylinder mixer and the like can be used.

B. Compression molding

Figure 1:
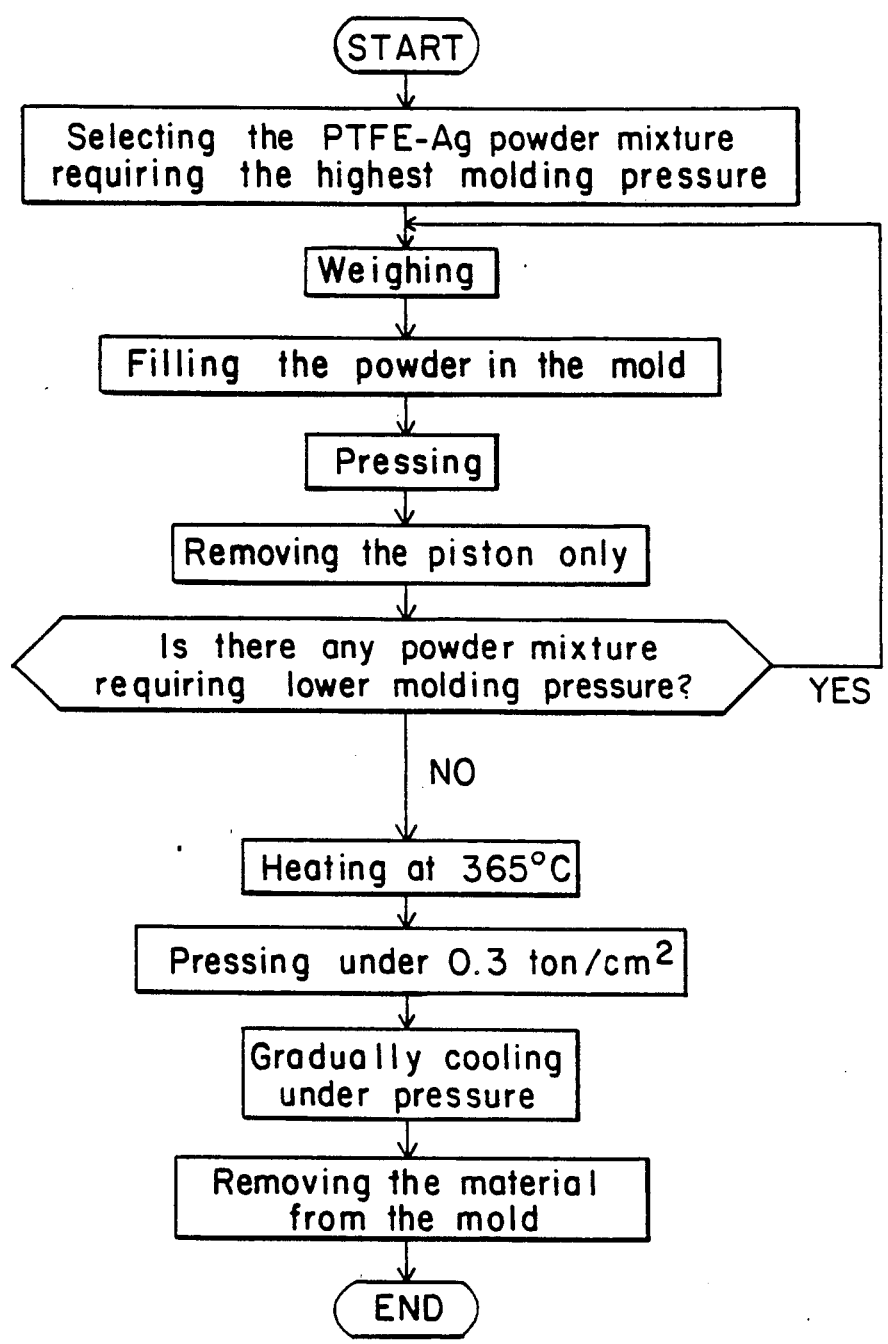
FIG. 1 is a flow chart illustrating the process for producing the functionally gradient material of the present invention.

Compression molding and subsequent steps are shown in the flow chart of FIG. 1.

An optimum molding pressure for the PTFE/Ag powder mixture depends on the composition and widely varies from 0.3 ton/cm$^2$ for the PTFE rich mixture to 3.0 ton/cm$^2$ for the silver rich mixture.

In the compression molding the powder mixtures each requiring different optimum molding pressure, firstly the powder mixture requiring the highest molding pressure, namely the mixture containing silver in the largest content is molded and then the mixtures requiring the decreasing molding pressure ar laminated.

C. Sintering

After the lamination, the material is heated and sintered at about 365° C. and hot pressed under a pressure of 0.3 ton/cm$^2$ (hot press). Alternatively, the laminated material is heated while isotropically pressing it (hot isostatic press).

Then, the material is cooled under pressure at a temperature decreasing rate of not larger than 50° C./hr. and removed from the mold.

The functionally gradient material of the present invention can be used as a material of anticorrosion heat exchangers, wear resistant bearings, etc., and will find its application in various fields such as aerospace and aircraft industries, chemical industries, machine industries, electric and electronics industries and laboratories.

PREFERRED EMBODIMENTS OF THE INVENTION

Examples

According to the above described production method with the use of the Matsuda type hydraulic high-pressure molding machine (manufactured by Matsuda Manufacturing Co., Ltd.), two types of the PTFE/Ag functionally gradient materials consisting of eleven layers which had the compositions of the Table were produced (No. 0 and No. 3). PTFE used in Examples was Polyflon (trade mark) M-12 having an average particle size of about 30 $\mu$m (manufactured by Daikin Industries, Ltd.), and the silver powder used was "Ag-E-250" (tree like powder) having an average particle size of 25 to 30 $\mu$m and an apparent specific gravity of 1.4 to 2.5 (manufactured by Fukuda Metal Foil and Powder Industries, Ltd.). In Table, the composition of Sample Nos. 0 and 3 are expressed in terms of the silver contents (volume %). The produced materials were of cylindrical form having a diameter of 20 mm and a height of 20 mm.

TABLE

| Layer No | Thickness (mm) | Sample No. 0 | Sample No. 3 |
|---|---|---|---|
| 1 | 1 | 0.00 | 0.00 |
| 2 | 2 | 5.00 | 0.005 |
| 3 | 2 | 10.0 | 0.08 |
| 4 | 2 | 15.0 | 0.405 |
| 5 | 2 | 20.0 | 1.28 |
| 6 | 2 | 25.0 | 3.13 |
| 7 | 2 | 30.0 | 6.48 |
| 8 | 2 | 35.0 | 12.0 |
| 9 | 2 | 40.0 | 20.5 |
| 10 | 2 | 45.0 | 32.8 |
| 11 | 1 | 50.0 | 50.0 |

Figure 2:
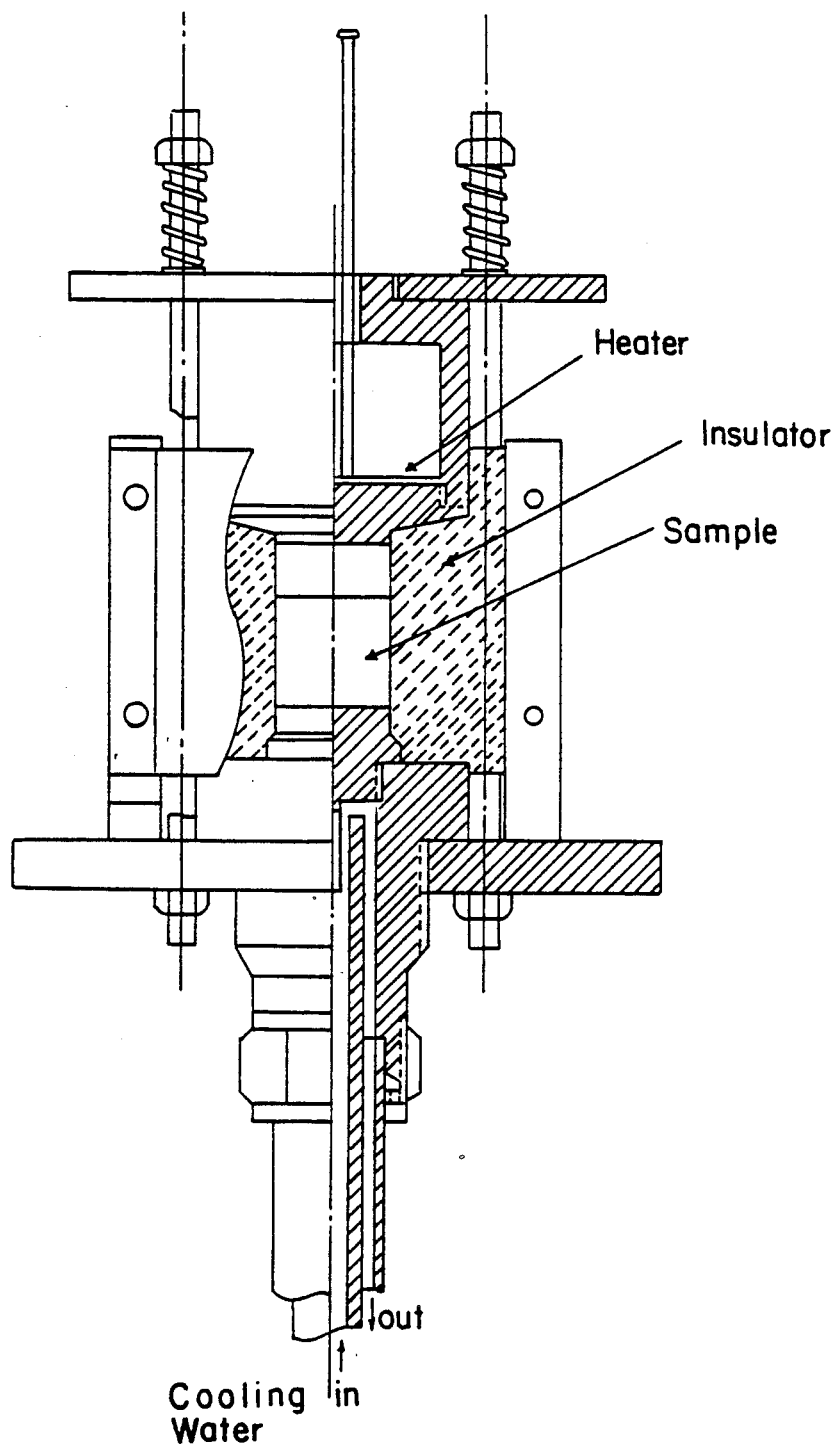
FIG. 2 is a partially cut away front elevation of an apparatus for evaluating the characteristics of the functionally gradient materials.

In each of Sample Nos. 0 and 3, the temperature distribution in the functionally gradient material was determined by using the apparatus of FIG. 2 and heating the pure PTFE side at about 180° C. and the other side at about 30° C. The temperatures of several parts of the functionally gradient material were measured by inserting ultra-thin lace type chromel-alumel thermocouples each having a diameter of 0.25 mm on the upper and lower surface and at three intermediate points.

Figure 4B:
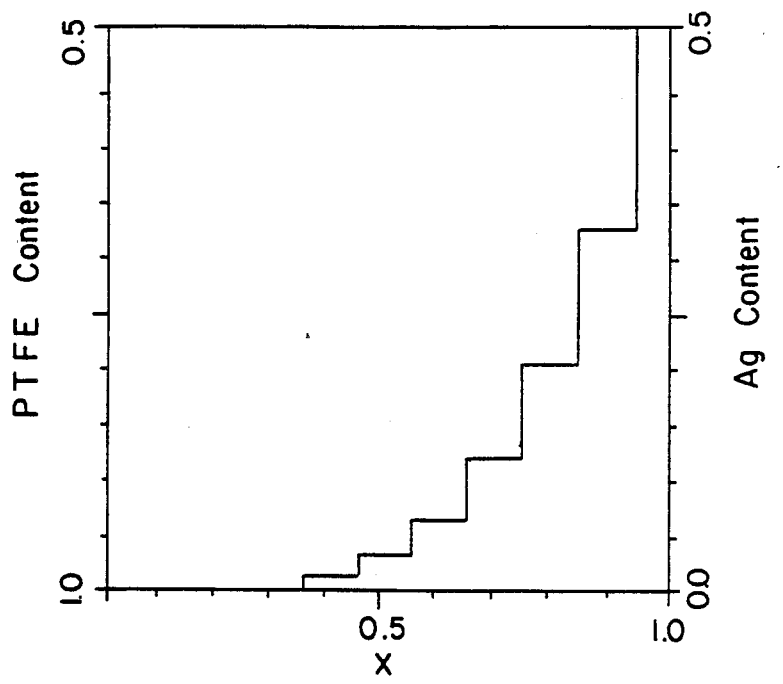
Figure 4A:
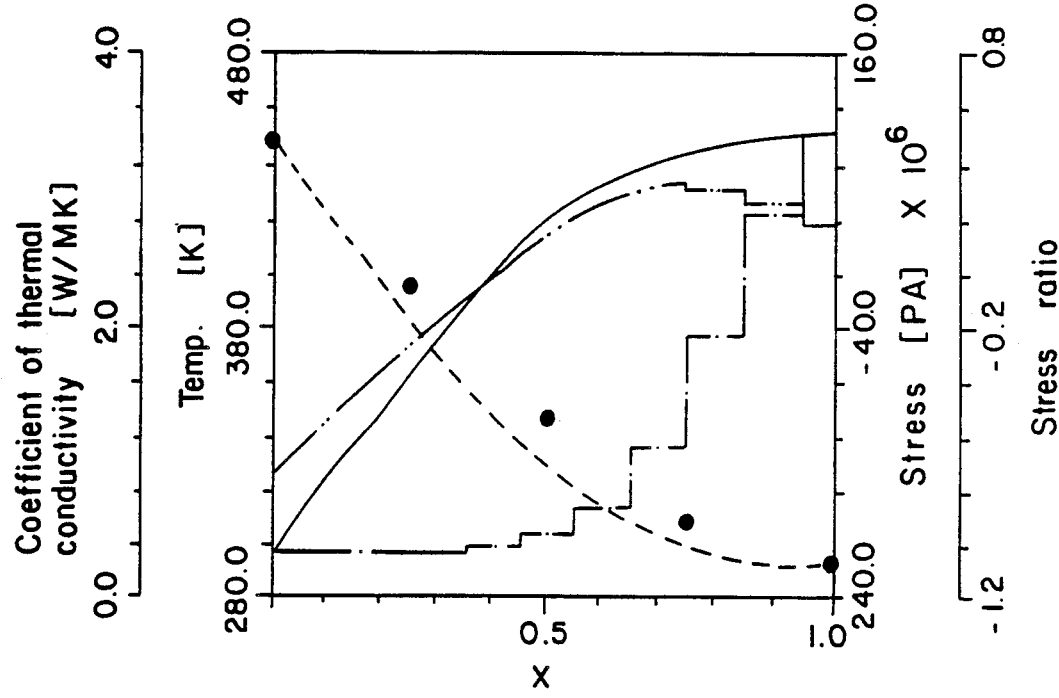
Figure 4D:
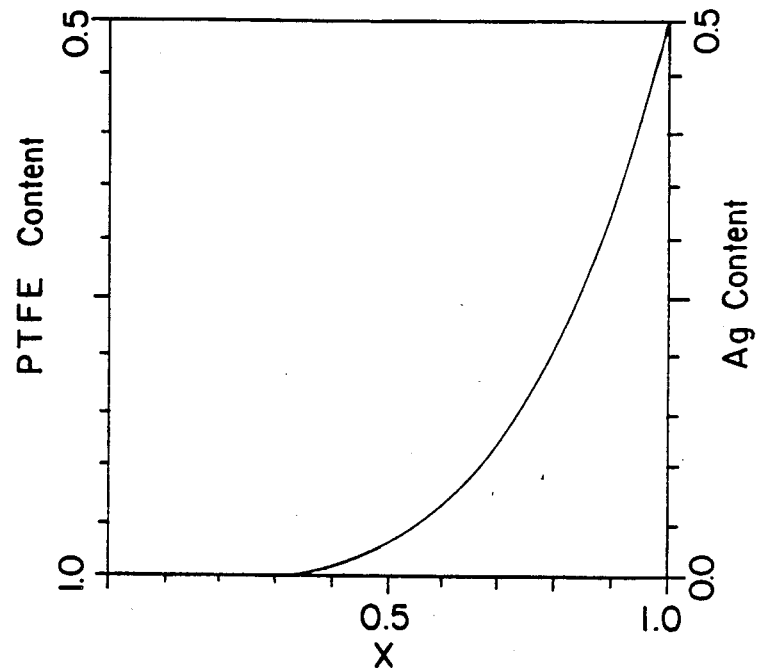
Figure 4C:
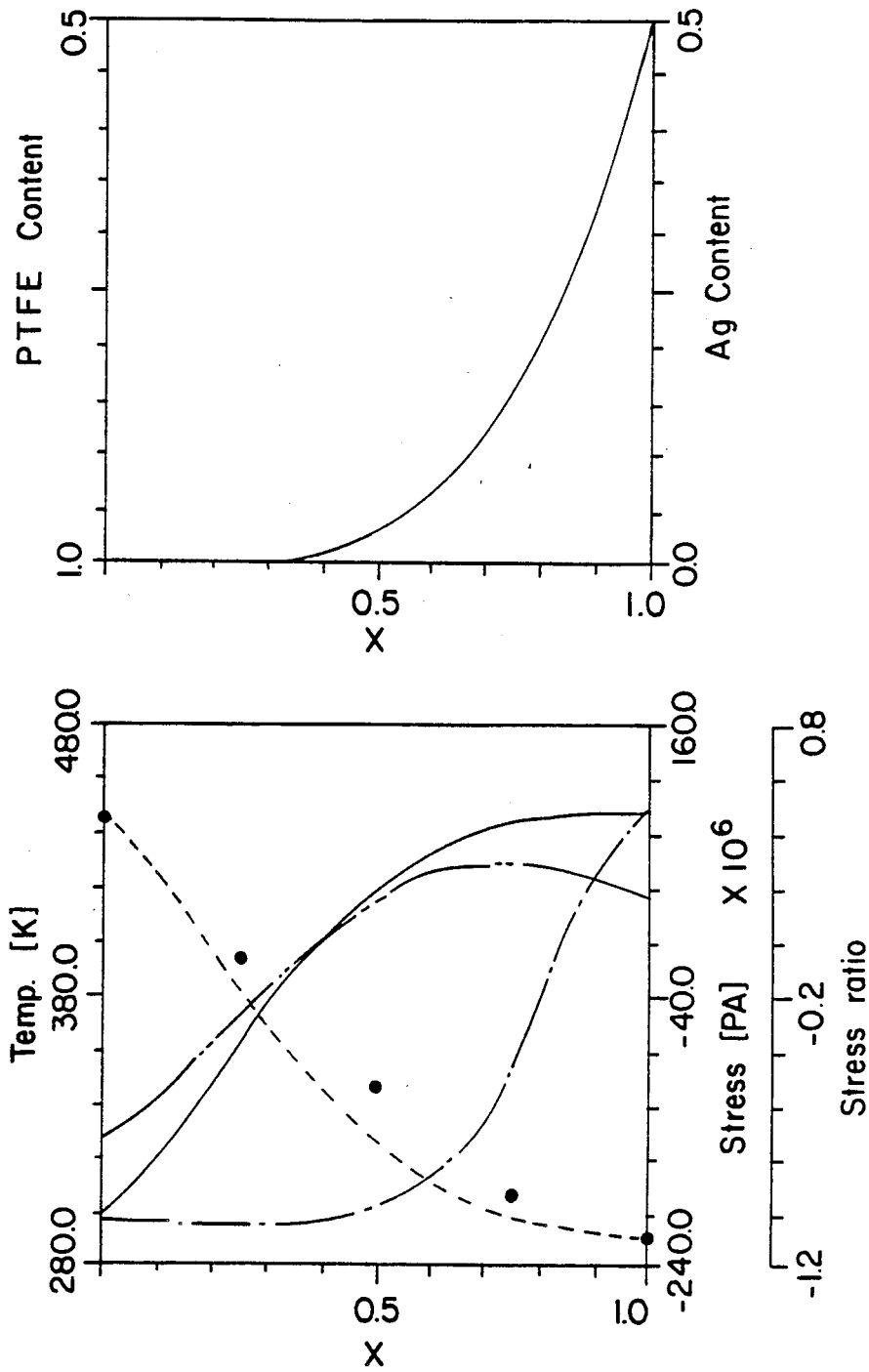

The measured temperature distributions are shown in FIG. 3A and 4A (solid circles).

The simulated temperature distributions, namely the numerical calculations by a computer are shown in FIGS. 3A and 4A by dashed lines. Further, the simulated results of thermal stress (solid lines), coefficients of thermal conductivity (alternating long and short dash lines) and stress ratios (alternating long and two short dashes lines) are shown in FIGS. 3A and 4A, although these were not actually measured.

From the results of FIGS. 3A and 4A, the measured temperatures at the intermediate points (solid circles) will coincide with the simulated results (dashed lines).

These properties were also simulated for the functionally gradient material in which the composition smoothly changes, although such functionally gradient material was not actually produced. The results are shown in FIGS. 3B and 4B.

From the coincidence of the temperature distributions, it can be concluded that the simulated results for the thermal stress, the coefficients of thermal conductivity and the stress ratio would reflect the actual values.

Comparing the results of FIG. 3A and 3B or 4A and 4B, since the simulated values have similar tendencies, the stepwise functionally gradient material has substantially the same function as the functionally gradient material in which the composition is smoothly changed.

What is claimed is:

1. A metal/polymer base functionally gradient material comprising a metal and a fluororesin in which the composition of the metal and the fluororesin is continuously changed from one side to the other.

2. The metal/polymer base functionally gradient material according to claim 1, wherein the fluororesin is polytetrafluoroethylene.

3. The metal/polymer base functionally gradient material according to claim 1, wherein the composition is stepwise changed.

4. The metal/polymer base functionally gradient material according to claim 1, wherein the composition is smoothly changed.

5. The metal/polymer base functionally gradient material according to claim 1, wherein the metal is silver.

6. The metal/polymer base functionally gradient material according to claim 5, wherein the silver has an average particle size of about 0.1 to 100 μm.

7. The metal/polymer base functionally gradient material according to claim 5, wherein the silver has an average particle size of 25 to 30 μm.

8. The metal/polymer base functionally gradient material according to claim 5, wherein the fluororesin is polytetrafluoroethylene.

9. The metal/polymer base functionally gradient material according to claim 5, wherein the composition is stepwise changed.

10. The metal/polymer base functionally gradient material according to claim 5, wherein the composition is smoothly changed.

11. The metal/polymer base functionally gradient material according to claim 5, wherein the fluororesin is a copolymer of tetrafluoroethylene and up to 40% by mole based on the amount of the tetrafluoroethylene of an ethylenically unsaturated comonomer selected from the group consisting of an olefin, a halogenated olefin and a perfluoro(alkyl vinyl ether).

* * * * *

UNITED STATES PATENT AND TRADEMARK OFFICE
CERTIFICATE OF CORRECTION

PATENT NO. : 4,997,708
DATED : March 5, 1991
INVENTOR(S) : Shoji Kawachi et al

It is certified that error appears in the above-identified patent and that said Letters Patent is hereby corrected as shown below:

On the title page, item [75] Inventors: change "Shogi" to --Shoji--.

Signed and Sealed this

Seventeenth Day of November, 1992

Attest:

DOUGLAS B. COMER

Attesting Officer

Acting Commissioner of Patents and Trademarks